July 15, 1952 W. L. KUHNS 2,603,185
STOCK DIPPING HOOK
Filed July 15, 1949
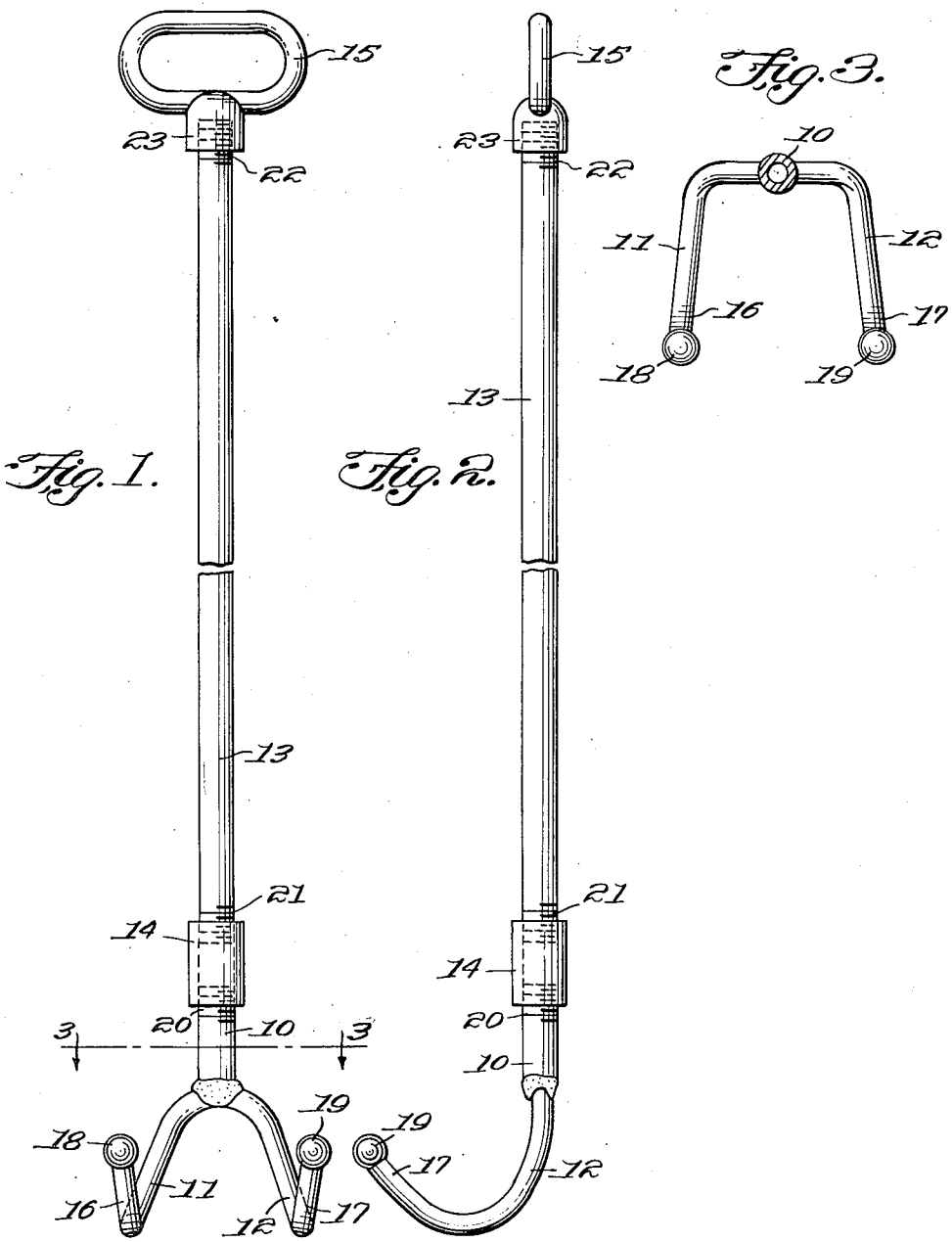
INVENTOR.
William L. Kuhns,
BY Victor J. Evans & Co.
ATTORNEYS Patented July 15, 1952

2,603,185

UNITED STATES PATENT OFFICE 2,603,185

STOCK DIPPING HOOK

William L. Kuhns, Clayton, N. Mex.

Application July 15, 1949, Serial No. 105,017

2 Claims. (Cl. 119—151)

This invention relates to dipping hooks for handling stock and particularly cattle and sheep in vats, and in particular dipping hooks having substantially helical prongs and removable handles and in which round knobs are provided on the ends of the prongs for preventing skinning and otherwise injuring cattle and sheep.

The purpose of this invention is to provide dipping hooks with removable handles so that the hooks, independent of the handles, may be conveniently shipped or sent through the mails. Stock dipping hooks of this type are provided with handles six to eight feet in length and because of the length of the handle it is difficult to ship the hooks through the mails or even by express. With this thought in mind this invention contemplates stock handling and dipping hooks in which the hooks are provided as separate independent units and suitable handles may be attached thereto by the farmer or verterinary.

The object of this invention is, therefore, to provide means for forming dipping hooks so that the hook portions thereof may readily be shipped or mailed and the handles therefor attached by the purchaser.

Another object of the invention is to provide improved stock dipping hooks to which handles of different lengths may readily be attached.

Another object of the invention is to provide stock dipping hooks that are formed so that cattle and sheep may be conveniently handled thereby without skinning or otherwise injuring the stock.

A further object of the invention is to provide stock dipping hooks with removable handles which are of a simple and economical construction.

With these and other objects and advantages in view the invention embodies hook shaped elements providing prongs with knobs on the ends and with threaded supporting shanks through which the hooks may readily be attached to tubular or wooden handles.

Other features and advantages of the invention will appear from the following description taken in connection with the drawings wherein:

Figure 1 is a front elevational view of a hook of the wishbone type showing a tubular handle attached to a shank extended from the hook by coupling elements and in which part of the handle is broken away.

Figure 2 is a side elevational view of the dipping hook shown in Figure 1.

Figure 3 is a sectional plan of the hook shown in Figure 1 taken on line 3—3 of Figure 1.

Referring now to the drawings wherein like reference characters denote corresponding parts the improved stock dipping hook of this invention includes a prong shank 10, prongs 11 and 12 extended oppositely from each side of the end of the shank with each prong forming part of a turn of a helix, a tubular handle shank 13 connected to the shank 10 by a sleeve coupling 14, and a hand gripping handle 15.

The hook is of the wishbone type with prongs 11 and 12 extended outwardly and downwardly from the shank 10 with each prong substantially forming a helix and extended similarly from opposite sides of the shank and with the outer ends 16 and 17 of the prongs extended upwardly and provided with knobs or balls 18 and 19, respectively. This hook shaped member is mounted on the lower end of a shank 10 which, in the design shown, is formed with a tube and the upper end of the shank is provided with threads 20 by which the shank is attached to a handle. As illustrated in Figure 1 the handle 13 is of the same size as that of the shank and with the lower end of the handle provided with threads 21 the handle is attached to the shank and hook by coupling 14. The upper end of the handle shank 13 is also provided with threads 22 and a hub 23 of the handle 15 is threaded thereon as shown. It will be understood that a hand gripping handle of any suitable shape or design may be used.

The handle 13 may be threaded into the opposite end of the coupling or the handle may be attached to the shank by suitable means.

With the parts arranged in this manner the hooks may be shipped independently of the handles and the cattle operator may make handles of wood or tubes and readily attach the handles to the shanks of the hooks. By this means it is possible for each user to provide handles corresponding to the depth of the vats in which the hooks are used. It is also possible to ship the hooks through the mails or by express whereas with long handles integral with the hooks it is substantially impossible to ship the dipping hooks.

It will be understood that modification may be made in the design and arrangement of the parts without departing from the spirit of the invention.

What is called is:

1. A stock dipping hook comprising a handle, a shank removably attached to one end of the handle, prongs extended outwardly in diverging relation from the end of the shank opposite to that on which the handle attaching means is provided, forming substantially a helix extended from each side of the center of the handle, and balls of the outer ends of the said prongs.

2. In a stock dipping hook, the combination which comprises a handle having threaded ends, an oval hand gripping handle having a hub thereon threaded on the outer end of the handle, a shank having a threaded end and having prongs extended outwardly in diverging relation from the end of the shank opposite to that on which the threads are positioned, forming substantially a helix extended from each side of the center of the handle, said prongs having balls on the ends, and a coupling sleeve threaded on the end of the handle opposite to that on which the hand gripping handle is positioned and also threaded on the threaded end of the shank for removably attaching the shank to the handle.

WILLIAM L. KUHNS.

REFERENCES CITED

The following references are of record in the file of this patent:

UNITED STATES PATENTS

| Number | Name | Date |
| --- | --- | --- |
| 13,672 | Welton | Oct. 9, 1855 |
| 677,297 | Watson | June 25, 1901 |
| 1,772,512 | Hathorn | Aug. 12, 1930 |

FOREIGN PATENTS

| Number | Country | Date |
| --- | --- | --- |
| 320,831 | Great Britain | Oct. 24, 1929 |